US012410897B1

(12) United States Patent
Pan

(10) Patent No.: US 12,410,897 B1
(45) Date of Patent: Sep. 9, 2025

(54) LIGHT AND SHADOW STRUCTURE OF THE DECORATION FOR WATER LAMP

(71) Applicant: HUIZHOU DICHENG ELECTRONIC TECHNOLOGY CO., LTD, Huizhou (CN)

(72) Inventor: Binjie Pan, Huizhou (CN)

(73) Assignee: HUIZHOU DICHENG ELECTRONIC TECHNOLOGY CO., LTD., Huizhou (CN)

( * ) Notice: Subject to any disclaimer, the term of this patent is extended or adjusted under 35 U.S.C. 154(b) by 0 days.

(21) Appl. No.: 18/669,546

(22) Filed: May 21, 2024

(51) Int. Cl.

| | |
|---|---|
| ***F21S 10/00*** | (2006.01) |
| ***F21V 3/04*** | (2018.01) |
| ***F21V 17/00*** | (2006.01) |
| ***F21V 23/00*** | (2015.01) |
| ***F21V 23/04*** | (2006.01) |
| ***F21V 31/00*** | (2006.01) |
| *F21Y 101/00* | (2016.01) |
| *F21Y 103/37* | (2016.01) |
| *F21Y 113/20* | (2016.01) |

(52) U.S. Cl.
CPC ............ *F21S 10/002* (2013.01); *F21V 3/049* (2013.01); *F21V 17/005* (2013.01); *F21V 23/007* (2013.01); *F21V 23/04* (2013.01); *F21V 31/00* (2013.01); *F21Y 2101/00* (2013.01); *F21Y 2103/37* (2016.08); *F21Y 2113/20* (2016.08)

(58) Field of Classification Search
CPC ...... F21S 10/002; F21V 3/049; F21V 17/005; F21V 23/007; F21V 23/04; F21V 31/00; F21Y 2113/20; F21Y 2103/37; F21Y 2101/00
See application file for complete search history.

(56) References Cited

U.S. PATENT DOCUMENTS

| | | | | |
|---|---|---|---|---|
| 9,222,663 B1 * | 12/2015 | Yang | F21S 6/002 | |
| 11,079,083 B1 * | 8/2021 | Yang | G09F 13/34 | |
| 11,175,032 B1 * | 11/2021 | Yang | F21V 33/0004 | |
| 2008/0273319 A1 * | 11/2008 | VanderSchuit | F21V 33/0028 | 362/101 |
| 2010/0272615 A1 * | 10/2010 | Yang | A61L 9/122 | 422/124 |

FOREIGN PATENT DOCUMENTS

| | | | |
|---|---|---|---|
| CN | 200940807 Y | * | 8/2007 |
| JP | 2012146552 A | * | 8/2012 |

* cited by examiner

*Primary Examiner* — Fatima N Farokhrooz
(74) *Attorney, Agent, or Firm* — Leong C. Lei

(57) ABSTRACT

A light and shadow structure of a water lamp ornament, includes: a main body of the water lamp, a base, a housing and an electronic control unit, the main body of the water lamp is a hollow translucent three-dimensional shape, the base is correspondingly fastened to one side of the water lamp body, the housing is located on the outside of the main body of the water lamp and has a light gathering pattern or a light scattering pattern, the electronic control unit includes a power supply part, and a first light emitting part and a second light emitting part electronically connected with the power supply part, the first light emitting part is used to irradiate the main body of the water lamp, the second light emitting part is located in the housing, and its light source realizes the light gathering or scattering pattern through the housing.

9 Claims, 5 Drawing Sheets

LIGHT AND SHADOW STRUCTURE OF THE DECORATION FOR WATER LAMP

TECHNICAL FIELD

The invention relates to the technical field of craft ornaments, and particularly relates to a light and shadow structure of the decoration for water lamp.

BACKGROUND ART

According to today's people focus on the quality of life, in the living space design and layout are required to atmosphere of relaxation and the sense of self space design, and in the living space set up decorations or lighting, in order to create an excellent atmosphere.

Currently, there are many types and styles of lighting, the more common of which are monochrome lighting, color-changing lighting or flashing lights, etc.; however, this type of lighting usually only has a single lighting function, it does not have the visual effect of creating an environment, while other works of water lamps with artistic modeling can form a beautifying effect on the indoor environment, however, they cannot have the functions of modeling and light effect changes at the same time. Therefore, if the above lighting can be combined with other parts of the interesting effects or break through the visual appearance of the advantages, I believe that it will be more popular among the public.

INVENTION CONTENTS

The purpose of the present invention is to provide a light and shadow structure of the decoration for water lamp that can make the light present a gathering or scattering light effect and improve the overall visual sense.

In order to solve the above technical problems, the invention can be realized by adopting the following technical solutions:

A light and shadow structure of the decoration for water lamp, including:

A main body of the water lamp, which is hollow and can be light transmittance of three-dimensional shape;

A base, which is correspondingly fastened to one side of the main body of the water lamp;

A housing, located on the outside of the main body of the water lamp and connected to the base, and the housing has a light gathering pattern or a light scattering pattern;

An electronic control unit comprising a power supply part, a first light emitting member and a second light emitting member electronically connected to the power supply part, the power supply part and the first light emitting member being provided in the base, the light source of the first light emitting member being used to irradiate the main body of the water lamp, and the second light emitting member being provided in the housing, and the light source of the second light emitting member being realized by the gathering or scattering pattern of the housing, to gather or scatter the light.

In one embodiment, the base is provided with a recess and a fixing slot is provided in the recess, a connection part is formed at an end of the housing corresponding to the recess, and a fixing post is provided at a bottom end of the connection part.

In one embodiment, the second light emitting member is any one of a plurality of light sources, a light bar, and a flexible filament.

In one embodiment, the main body of the water lamp comprises an outer shell and a water lamp cover, the water lamp cover is closed at the bottom of the outer shell to form a confined space, and the confined space is filled with a flowable liquid.

In one embodiment, the surface of the outer shell is provided with a pattern.

In one embodiment, a motor with a magnetic shaft is provided at the bottom of the main body of the water lamp, which is electronically connected to the power supply part, and a magnetic rotary member corresponding to the magnetic shaft is provided at the interior of the main body of the water lamp, which is magnetically attracted by the magnetic shaft and rotates therewith.

In one embodiment, the interior of the main body of the water lamp is provided with an interior view.

In one embodiment, the second light emitting member is connected to the power supply part by a terminal plug-in method.

In one embodiment, the electronic control unit further comprises a switch that provides power to turn on and off the power supply part.

In one embodiment, the switch can control the simultaneous starting and stopping of the first light emitting member and the second light emitting member or the partial starting and stopping of the first light emitting member.

In order to solve the above technical problems, the present utility model can also be realized by adopting the following technical solutions:

A light and shadow structure of the decoration for water lamp, comprising:

A main body of the water lamp, which is hollow and can transmit light in three-dimensional shape, comprises an outer shell and a water lamp cover, the water lamp cover being hermetically closed at the bottom of the outer shell to form a confined space, and the confined space being filled with a flowable liquid, the surface of the housing is provided with a pattern, the bottom of the main body of the water lamp is provided with a motor having a magnetic shaft, the motor is electronically connected to the power supply part, and a magnetic rotary member is provided in the interior of the main body of the water lamp corresponding to the magnetic shaft, and the magnetic rotary member is magnetically attracted by the magnetic shaft and rotates therewith, the main body of the water lamp is provided with an interior view;

A base, which is correspondingly fastened to one side of the main body of the water lamp, which is provided with a recess and a fixing slot is provided in the recess, the housing has a connection part formed at the end corresponding to the recess, and a fixing post is provided at the bottom end of the connection part;

A housing, located on the outside of the main body of the water lamp, and connected to the base, and the housing has a light gathering pattern or light scattering pattern;

An electronic control unit comprising a power supply part, a first light emitting member and a second light emitting member electronically connected to the power supply part, the power supply part and the first light emitting member are located in the base, the light source of the first light emitting member is used to irradiate the main body of the water lamp, and the second light emitting member is located in the housing, and the light source is realized by the concentrating or diffusing pattern of the housing to gather or scatter the light, the second light emitting member is any one of a plurality of light sources, light bars, or flexible filaments, the second light emitting member is connected to the power supply part by means of a terminal plug-in connection, the electronic control unit comprises a switch for switching on and off the power supply part, which controls the simultaneous starting and stopping or the segmented starting and stopping of the first light emitting member and the second light emitting member.

The beneficial effect is:

The light and shadow structure of the invention water lamp ornament has a first light-emitting member in the base and a second light-emitting member in the housing, where the light source of the first light-emitting member irradiates the main body of the water lamp, so that the main body of the water lamp transmits light, while the second light-emitting member illuminates itself inside its housing, and through the gathering pattern or scattering pattern of the housing, so that the light source of the second light-emitting member forms a gathering effect or a scattering effect, and then, finally, combines the main body of the water lamp and the housing with the second light-emitting member to form a gathering effect or a scattering effect. Finally, it combines the three-dimensional modeling of the main body of the water lamp and the housing, so that the water lamp ornaments have unique modeling, and light effects and other functions, to improve the overall visual appearance of the water lamp ornaments, so as to effectively attract consumers.

DETAILED DESCRIPTION OF THE EMBODIMENTS

In order to make the above purposes, features and advantages of the invention more obvious and understandable, the following description of the specific embodiment of the invention is made in detail in conjunction with the accompanying drawings. Many specific details are set forth in the following description in order to facilitate a full understanding of the invention. However, the present invention can be implemented in many other ways different from those described herein, and the person skilled in the art can make similar improvements without violating the connotation of the present invention, so the present invention is not limited by the specific embodiments disclosed below.

It should be noted that when a component is said to be "fixed" to another component, it may be directly on the other component or there may also be centered components. When a component is said to be "attached" to another component, it may be directly attached to the other component or there may be both centered components. Conversely, when a component is said to be "directly on" another component, there is no intermediate component. The terms "vertical," "horizontal," "left," "right," and similar expressions used herein are for illustrative purposes only.

Unless otherwise defined, all technical and scientific terms used herein have the same meaning as commonly understood by those skilled in the art of the present invention. Terms used herein in the specification of the present invention are for the purpose of describing specific embodiments only and are not intended to limit the present invention. The term "and/or" as used herein includes any and all combinations of one or more of the relevant listed items.

Figure 1:
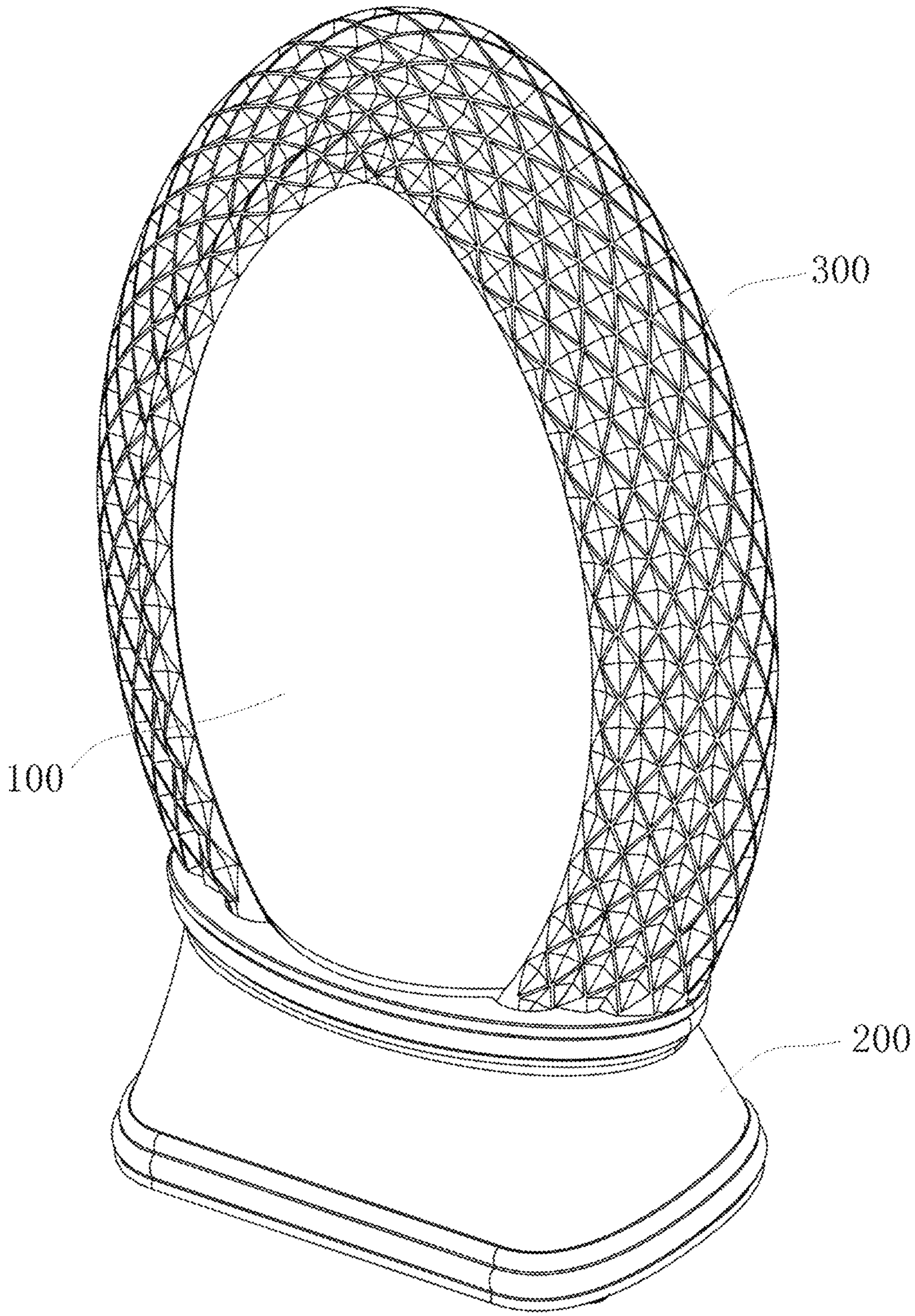
FIG. 1 is a schematic diagram of the light and shadow structure of the invention.
Figure 2:
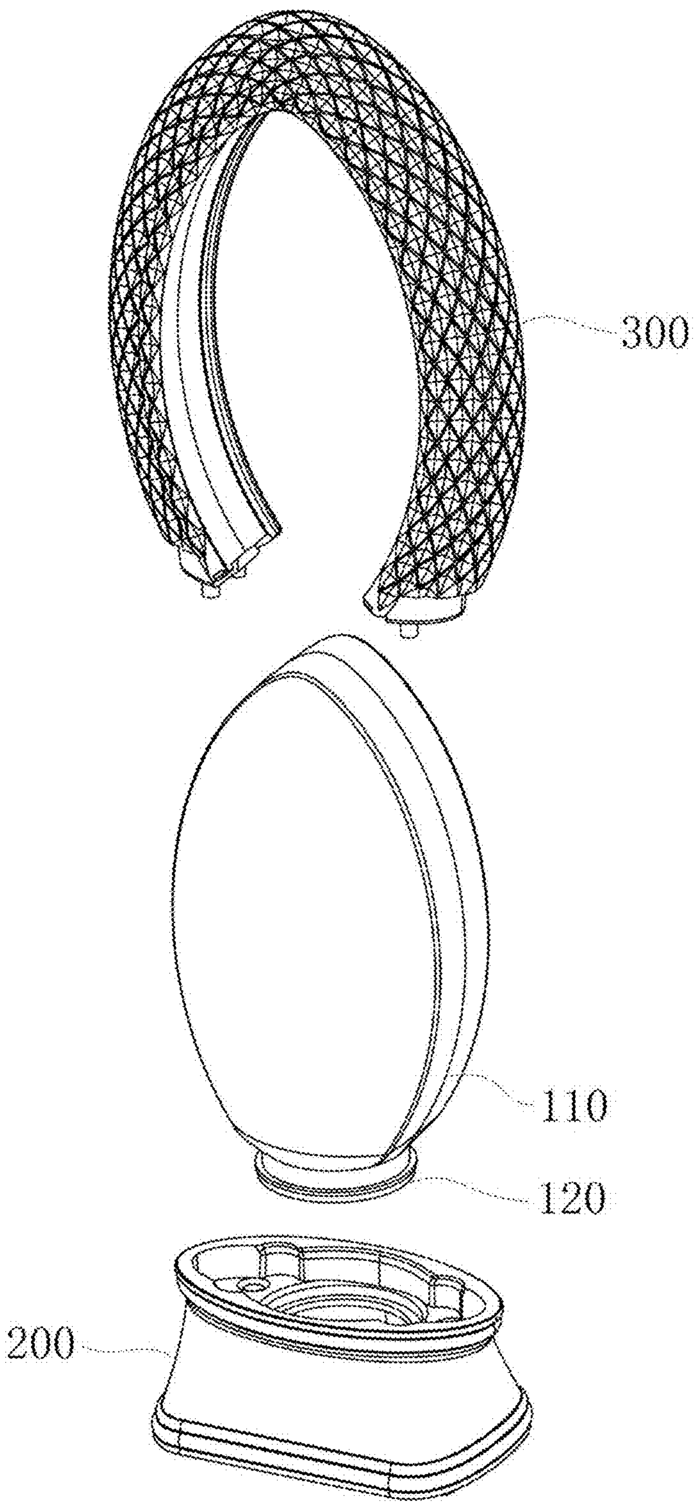
FIG. 2 is a decomposition diagram of the light and shadow structure of the invention.
Figure 3:
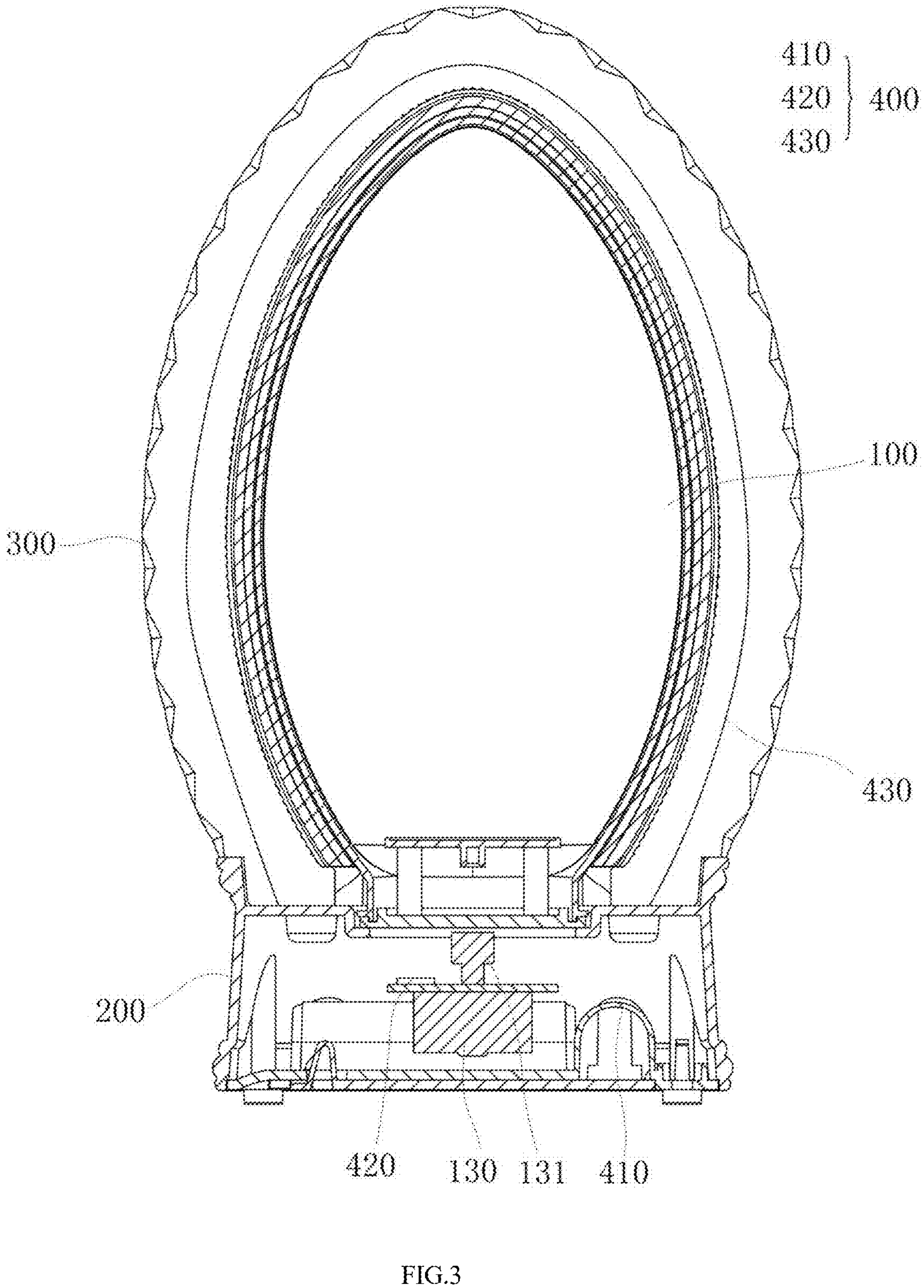
FIG. 3 is a partial view of the light and shadow structure of the invention.

Referring to FIGS. 1 through 3, a light and shadow structure of the decoration for water lamp comprising:

A main body of the water lamp 100, which is a hollow and light transmissible three-dimensional shape;

A base 200, which is correspondingly fastened to one side of the main body of the water lamp 100;

A housing 300, located on the outside of the main body of the water lamp 100, and connected to the base 200, and the housing 300 has a light gathering pattern or a light scattering pattern;

An electronic control unit 400, comprising a power supply part 410, and a first light emitting member 420 and a second light emitting member 430 electronically connected to the power supply part 410, the power supply part 410 and the first light emitting member 420 are located at the base 200, the light source of the first light emitting member 420 is used to irradiate the main body of the water lamp 100, and the second light emitting member 430 is located at the housing 300, and the light source is realized by the light gathering or scattering pattern of the housing 300.

Specifically, in this embodiment, the main body of the water lamp 100 for the hollow translucent three-dimensional shape, its shape can be designed according to the actual production needs, and in order to place the main body of the water lamp 100, so the main body of the water lamp 100 at the bottom of the base 200, at the same time, in the main body of the water lamp 100 on the outside of the housing 300, the shape of the housing 300 can be combined with the shape of the main body of the water lamp 100, so as to break the appearance of the visual effect, and the housing 300 can be connected with the base 200, of course, in order to realize the lighting effect, a power supply part 410 and a first light emitting member 420 are provided in the base 200, and the light source emitted by the first light emitting member 420 can irradiate the main body of the water lamp 100 so that the main body of the water lamp 100 can project light, and a second light emitting member 430 is provided in the housing 300, and the second light emitting member 430 emits a light source, which is then used to form a spotlight effect and a light scattering effect by the concentrating or scattering pattern of the housing 300, and the concentrating or scattering pattern can be a diamond pattern, a diagonal pattern, etc. Finally, through the three-dimensional modeling of the main body of the water lamp 100, the base 200, and the housing 300 of the water lamp, combined with the irradiation of the light source of the first light emitting member 420, the irradiation of the second light emitting member 430, and the light gathering pattern and the light scattering pattern of the housing 300, the water lamp ornament can be made to have both unique modeling, and the light sensing effect and other functions, so as to improve the overall visual impression of the water lamp ornament and to effectively attract consumers.

Of course, in order to facilitate the layout of the second light emitting member 430, the second light emitting member 430 may use plural light sources, or light strips, or flexible filaments, the plural light sources, light strips, or flexible filaments can be electronically connected to the power supply part 410, and in order to facilitate the assembly of the second light emitting member 430 and the power supply part 410, the second light emitting member 430 may be connected by means of terminal plugging and power supply part 410, thereby facilitating the layout of the second light emitting member 430 and facilitating the assembly and connection of the second light emitting member 430 and the power supply part 410.

In addition, the interior view (not shown in the drawings) can also be set inside the main body of the water lamp 100, the setting of which is an existing technology, and therefore will not be repeated herein, and the interior view can improve the overall interest of the water lamp ornaments, thereby enhancing the visual perception of the user.

Figure 4:
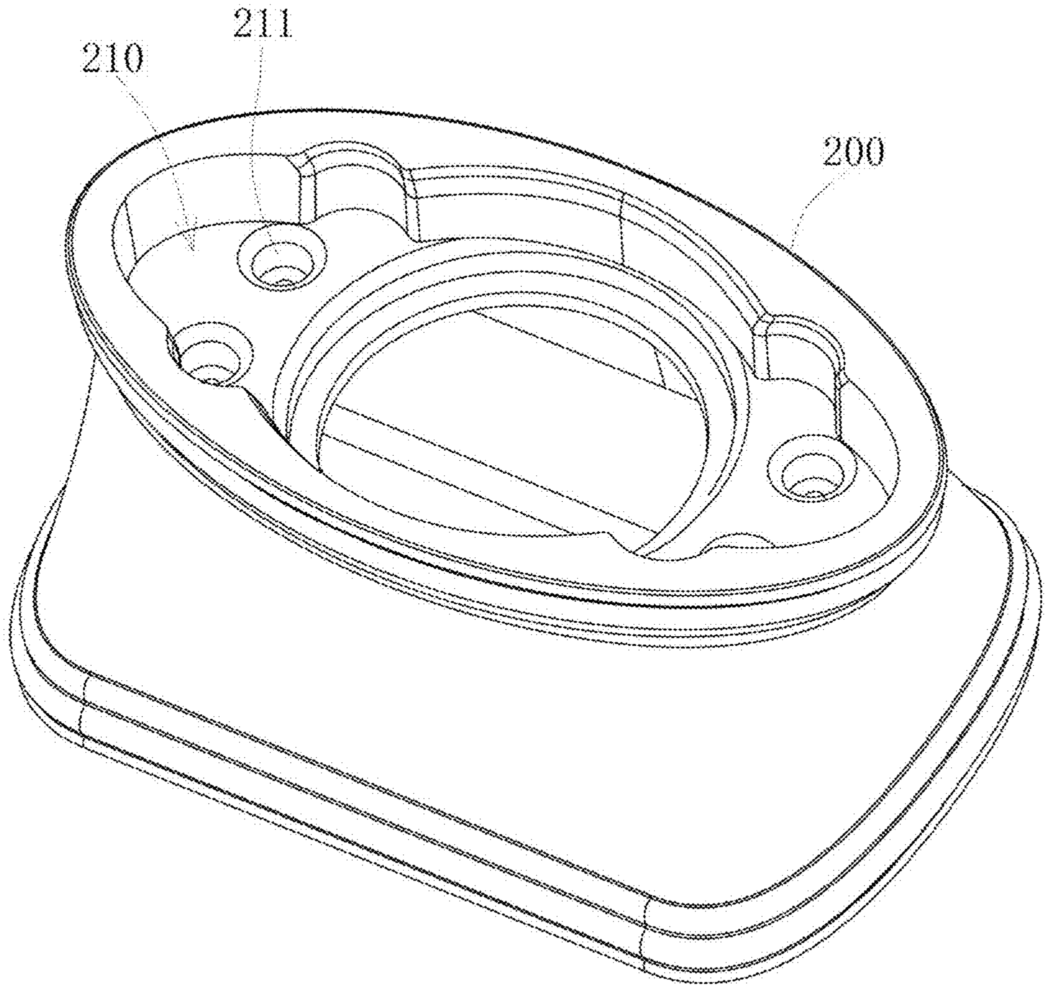
FIG. 4 is a schematic diagram of the base of the light and shadow structure of the present invention.
Figure 5:
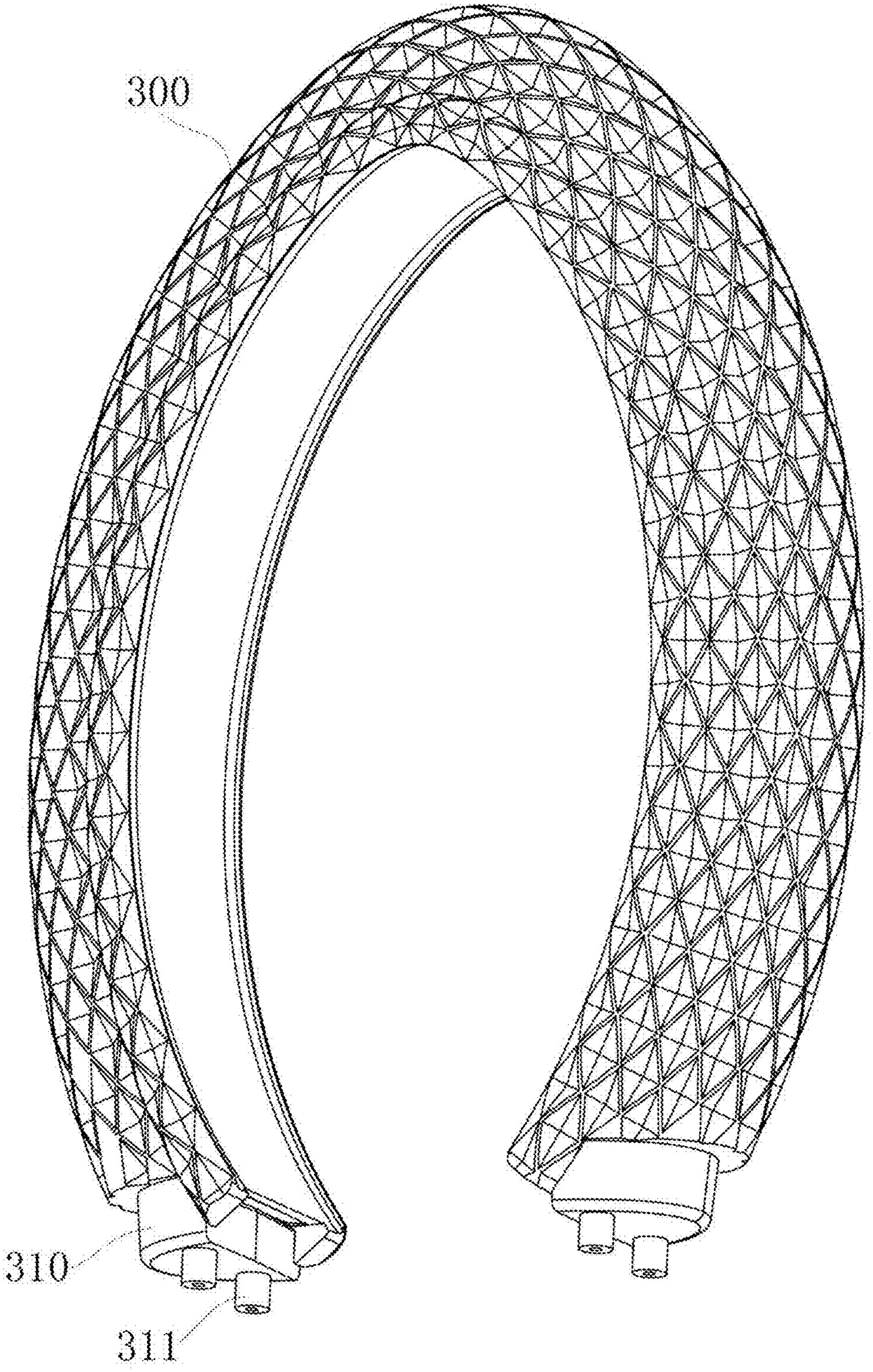
FIG. 5 is a schematic diagram of the outer shell of the light shadow structure of the present invention water lamp ornament.

Referring to FIGS. 4 and 5, in order to facilitate the coordination between the housing 300 and the main body of the water lamp 100, and to facilitate the fixing of the housing 300, therefore, in the present embodiment, the base 200 is provided with a recess 210, and a fixing slot 211 is provided in the recess 210, at the same time, the end of the housing 300 is formed with the connection part 310 corresponding to the recess 210, and a fixing post 311 is provided at the bottom end of the connection part 310, when the housing 300 is assembled, the housing 300 is partially covered with the main body of the water lamp 100, so that the housing 300 and the main body of the water lamp 100 are matched to form a unique three-dimensional modeling, and after the housing 300 is matched with the main body of the water lamp 100, the connection part 310 of the two ends of the housing 300 are inserted into the recess 210 of the base 200, and the fixing post 311 is inserted into the fixing slot 211 to realize the connection and fixing between the housing 300 and the base 200.

In order to make the connection between the housing 300 and the base 200 more solid, it can be connected by screwing through the fixing slot 211 and the fixing post 311, so as to make the connection between the housing 300 and the base 200 more stable.

Referring to FIG. 2, in order to improve the interest and appreciation of the main body of the water lamp 100, the main body of the water lamp 100 can be filled with liquid, and in order to facilitate the filling of the liquid and placing of the interior objects, the main body of the water lamp 100 in the present embodiment includes the outer shell 110 and the water lamp cover 120, the water lamp cover 120 of the water lamp is closed to close to the bottom center of the outer shell 110 to form a confined space, and the liquid is filled with liquid in the confined space, the liquid is filled in the confined space, and by sealing the outer shell 110 and the water lamp cover 120, the liquid in the confined space can be prevented from flowing out, and it is convenient to install the interior objects.

At the same time, a pattern (not visible in the drawings) may be set on the surface of the outer shell 110, such as spray painting, sticking, etc., and the light source of the first light emitting member 420 irradiates the main body of the water lamp 100, and the light source irradiates the pattern, so that the consumer can intuitively see the pattern, thereby improving the consumer's visual perception.

In this embodiment, the liquid in the confined space can be stirred and then irradiated by the light source of the first light emitting member 420, and the light source is refracted through the flowing liquid, so that the overall structure of the water lamp ornament has more interesting efficacy and light effect. In order to realize the flow of liquid in the confined space, the bottom of the main body of the water lamp 100 is provided with a motor 130 having a magnetic shaft 131, electronically connecting the motor 130 to the power supply part 410, at the same time, there is a magnetic rotating member (not shown in the figure, it is the existing structure) corresponding to the magnetic shaft 131 inside the main body of the water lamp 100, when the power supply part 410 supplies power to make the motor 130 work, the magnetic shaft 131 of the motor 130 will rotate, and the magnetic rotating member will be rotated by the magnetic attraction of the magnetic shaft 131, which will then rotate the magnetic rotating member to stir the liquid in the confined space, so as to improve the efficacy of the water lamp ornament.

At the same time, a pattern may be spray-painted on the side wall of the outer shell 110, and the light source of one of the groups of light emitting members 420 irradiates the main body of the water lamp 100, and the light source irradiates the spray-painted pattern, so that the consumer can intuitively see the pattern, so as to improve the consumer's visual sensibility.

In this embodiment, the liquid in the confined space can be stirred, and then irradiated by the light source of one group of light emitting members 420, and the light source is refracted through the flowing liquid, so as to make the light and shadow water lamp structure more interesting and light effects. In order to realize the flow of liquid in the confined space, the bottom of the main body of the water lamp 100 is provided with a magnetic shaft 131 of the motor 130, the motor 130 is electronically connected to the power supply part 410, at the same time, there is a magnetic rotating member 140 corresponding to the magnetic shaft 131 in the interior of the main body of the water lamp 100, when the power supply part 410 supplies power to make the motor 130 work, the magnetic shaft 131 of the motor 130 will rotate, and the magnetic rotating member 140 will be magnetically attracted by the magnetic shaft 131 and rotate accordingly, so that the liquid in the confined space will be stirred by the magnetic rotating member 140, thereby improving the efficacy of the light and shadow water lamp structure.

Of course, the sequins (green onion powder) can also be placed in the liquid, and when the liquid is flowing, the sequins (green onion powder) will be driven to flow, and then irradiated by the light source of the first light emitting member 420, so that the sequins (green onion powder) will project a colorful and dazzling light, thus enhancing the visual perception and making it more favored by the consumers.

Referring to FIG. 3, in order to control the light effect of the water lamp ornament, the electronic control unit 400 includes a switch (not shown in the figure), wherein the switch can turn on and off the power of the power supply part 410, which can be a built-in rechargeable battery, or a replaceable ordinary battery.

At the same time, the switch may be used to control simultaneous start-stop or segmented start-stop of the first light emitting member 420 and the second light emitting member 430, for example, by pressing the switch, the first light emitting member 420 and the second light emitting member 430 are illuminated at the same time, so that the light source of the first light emitting member 420 is irradiated to the main body of the water lamp 100, and the light source of the second light emitting member 430 passes through the gathering pattern or the scattering pattern of the housing 300 to form a gathering effect or a scattering effect; the switch can be pressed to control the first light emitting member 420/second light emitting member 430 to light up, press the switch again to control the first light emitting member 420/second light emitting member 430 to extinguish, the second light emitting member 430/first light emitting member 420 to light up, and then press the switch again to extinguish the first light emitting member 420 and the second light emitting member 430, so as to form a segmented start-stop, so that the light effect of the decoration for water lamp can be more intelligent, and improve the overall fun of decoration for water lamp.

Finally, the switch in the present embodiment may be set at the bottom of the base 200, and may be a key switch, a toggle switch, or an inductive switch, etc. When the inductive switch is used, a human infrared intelligence inductive switch, an acoustic inductive switch, etc. may be selected, so that the light effect of the first light emitting member 420 and the second light emitting member 430 may be effectively controlled, thereby improving the fun of the water lamp ornament.

However, the above mentioned is only a better example of the present utility model, and is not intended to limit the features of the present utility model, and any re-creation utilizing the relevant technical means and principles of the present utility model is still within the scope of the invention of the present utility model. Any equal changes and modifications made by any person skilled in the art, without departing from the spirit and scope of the invention, shall be covered by the scope of the patent of the invention in order to be reasonable.

What is claimed is:

1. A light and shadow structure of the decoration for water lamp, comprising: a main body of the water lamp, which is hollow and filled with water and can transmit light in three-dimensional shape; a base, which is correspondingly fastened to one side of the main body of the water lamp; a housing, located on the outside of the main body of the water lamp, and connected to the base, and the housing has a light gathering pattern or light scattering pattern; an electronic control unit comprising a power supply part, a first light emitting member and a second light emitting member electronically connected to the power supply part, the power supply part and the first light emitting member are located in the base, the light source of the first light emitting member is used to irradiate the main body of the water lamp, and the second light emitting member is located in the housing, and the light source is realized by the concentrating or diffusing pattern of the housing to gather or scatter the light; wherein, the base is provided with a first recess and a fixing slot is provided in the first recess, the housing has a connection part formed at the end corresponding to the first recess, and a fixing post is provided at the bottom end of the connection part; wherein the main body is fixed within a second recess that is formed within the first recess; wherein, the bottom of the main body of the water lamp is provided with a motor having a magnetic shaft, the motor is electronically connected to the power supply part, and a magnetic rotary member is provided in the interior of the main body of the water lamp corresponding to the magnetic shaft, and the magnetic rotary member is magnetically attracted by the magnetic shaft and rotates therewith.

2. The light and shadow structure for a decoration for water lamp of claim 1, characterized in: the second light emitting member is any one of a plurality of light sources, light bars, or flexible filaments.

3. The light and shadow structure of a decoration for water lamp of claim 1, characterized in: the main body of the water lamp comprises an outer shell and a water lamp cover, the water lamp cover being hermetically closed at the bottom of the outer shell to form a confined space, and the confined space being filled with a flowable liquid.

4. The light and shadow structure of a decoration for water lamp of claim 1, characterized in: the main body of the water lamp is provided with an interior view.

5. The light and shadow structure of a decoration for water lamp of claim 1, characterized in: the second light emitting member is connected to the power supply part by means of a terminal plug-in connection.

6. The light and shadow structure for a decoration for water lamp of claim 1, characterized in: the electronic control unit comprises a switch for switching on and off the power supply part.

7. The light and shadow structure of a decoration for water lamp of claim 3, characterized in: the surface of the housing is provided with a pattern.

8. The light and shadow structure for a decoration for water lamp of claim 6, characterized in that the switch controls the simultaneous starting and stopping or the segmented starting and stopping of the first light emitting member and the second light emitting member.

9. A light and shadow structure of the decoration for water lamp, comprising: a main body of the water lamp, which is hollow and can transmit light in three-dimensional shape and comprises an outer shell, the main body being hermetically closed at the bottom of the outer shell to form a confined space, and the confined space being filled with a liquid, a housing, located on the outside of the main body of the water lamp, the bottom of the main body of the water lamp is provided with a motor having a magnetic shaft, the motor is electronically connected to the power supply part, and a magnetic rotary member is provided in the interior of the main body of the water lamp corresponding to the magnetic shaft, and the magnetic rotary member is magnetically attracted by the magnetic shaft and rotates therewith, the main body of the water lamp is provided with an interior view; a base, which is correspondingly fastened to one side of the main body of the water lamp, the base is provided with a first recess and a fixing slot is provided in the first recess, the housing has a connection part formed at the end corresponding to the first recess, and a fixing post is provided at the bottom end of the connection part; the housing is connected to the base, and the housing has a light gathering pattern or light scattering pattern; wherein the main body is fixed within a second recess that is formed within the first recess; an electronic control unit comprising a power supply part, a first light emitting member and a second light emitting member electronically connected to the power supply part, the power supply part and the first light emitting member are located in the base, the light source of the first light emitting member is used to irradiate the main body of the water lamp, and the second light emitting member is located in the housing, and the light source is realized by the concentrating or diffusing pattern of the housing to gather or scatter the light, the second light emitting member is any one of a plurality of light sources, light bars, or flexible filaments, the second light emitting member is connected to the power supply part by means of a terminal plug-in connection, the electronic control unit comprises a switch for switching on and off the power supply part, which controls the simultaneous starting and stopping or the segmented starting and stopping of the first light emitting member and the second light emitting member.

* * * * *